(12) United States Patent
Oberhammer et al.

(10) Patent No.: US 8,964,608 B2
(45) Date of Patent: Feb. 24, 2015

(54) INTERFERENCE CANCELLATION FOR DIVISION FREE DUPLEXING OR FULL DUPLEX OPERATION

(71) Applicant: Futurewei Technologies, Inc., Plano, TX (US)

(72) Inventors: Wolfgang Oberhammer, Kanata (CA); Eddy Hum, Ottawa (CA); Wen Tong, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 94 days.

(21) Appl. No.: 13/739,927

(22) Filed: Jan. 11, 2013

(65) Prior Publication Data

US 2014/0198691 A1 Jul. 17, 2014

(51) Int. Cl.
*H04B 3/20* (2006.01)
*H04B 15/00* (2006.01)
*H04B 1/10* (2006.01)

(52) U.S. Cl.
CPC ............ *H04B 15/00* (2013.01); *H04B 1/525* (2013.01); *H04B 1/10* (2013.01)
USPC ........................................................ 370/286

(58) Field of Classification Search
USPC .................... 370/201, 278, 282, 286–292; 375/219–221, 346; 455/296, 63, 1
See application file for complete search history.

(56) References Cited

U.S. PATENT DOCUMENTS

| 4,789,993 | A | * | 12/1988 | Ryu ............................... 375/214 |
| 7,817,641 | B1 | | 10/2010 | Khandani |
| 8,570,933 | B2 | * | 10/2013 | Lioliou et al. ................ 370/315 |
| 2003/0161419 | A1 | | 8/2003 | Bach et al. |
| 2004/0106381 | A1 | * | 6/2004 | Tiller ............................. 455/73 |
| 2007/0184782 | A1 | * | 8/2007 | Sahota et al. ................ 455/63.1 |
| 2008/0032632 | A1 | * | 2/2008 | Choi et al. .................... 455/63.1 |
| 2008/0107046 | A1 | | 5/2008 | Kangasmaa et al. |
| 2008/0198772 | A1 | * | 8/2008 | Loh ............................... 370/277 |
| 2008/0198773 | A1 | * | 8/2008 | Loh ............................... 370/278 |
| 2009/0180404 | A1 | * | 7/2009 | Jung et al. ..................... 370/279 |
| 2009/0323856 | A1 | * | 12/2009 | McCallister .................. 375/296 |
| 2010/0195543 | A1 | * | 8/2010 | Jung et al. ..................... 370/279 |
| 2011/0249596 | A1 | | 10/2011 | Ross et al. |
| 2011/0256857 | A1 | * | 10/2011 | Chen et al. ................. 455/422.1 |
| 2011/0319044 | A1 | * | 12/2011 | Bornazyan ................. 455/233.1 |
| 2012/0106405 | A1 | * | 5/2012 | Lioliou et al. ................ 370/279 |
| 2013/0102254 | A1 | * | 4/2013 | Cyzs et al. .................... 455/63.1 |
| 2013/0155913 | A1 | * | 6/2013 | Sarca ............................ 370/277 |
| 2013/0188760 | A1 | * | 7/2013 | Subramanian et al. ....... 375/346 |

FOREIGN PATENT DOCUMENTS

CN 101141235 A 3/2008
CN 101563851 A 10/2009

OTHER PUBLICATIONS

Patent Abstract for US7817641 (B1); Oct. 19, 2010; Khandani.

(Continued)

*Primary Examiner* — Kerri Rose

(57) ABSTRACT

In full duplex operation, a first signal is transmitted from a wireless device while a second signal in the same frequency band as the first signal is received at the device. A third signal can be generated that accounts for channel characteristics on the transmitted first signal. The third signal can be applied to the received second signal to compensate for interference caused by the transmitted first signal.

18 Claims, 11 Drawing Sheets

(56) References Cited

OTHER PUBLICATIONS

Patent Abstract for US2003161419 (A1); Aug. 28, 2003; Bach, et al.
Patent Abstract for US2011249596 (A1); Oct. 13, 2011; Fergus, et al.
Patent Abstract for US2008107046 (A1); May 8, 2008; Seppo, et al.
Patent Abstract for CN101141235 (A); Mar. 12, 2008; Jiao, et al.

Pushing the Limits of Full-Duplex: Design and Real-Time Implementation; Sahai, et al.; Department of Electrical and Computer Engineering Rice University, Technical Report TREE 1104; pp. 1-12.
Achieving Single Channel, Full Duplex Wireless Communication; Choi, et al.; Stanford University; pp. 1-12.
Practical, Real-Time, Full Duplex Wireless; Jain, et al.; Stanford University Sep. 22, 2011; pp. 1-103.

\* cited by examiner

INTERFERENCE CANCELLATION FOR DIVISION FREE DUPLEXING OR FULL DUPLEX OPERATION

BACKGROUND

The communication route between communicating devices can include a signal that is transmitted from a first device and received at another device, and another signal that is transmitted from a second device and received at the first device at the same time that the first signal is transmitted. To avoid interference between the two signals, duplex communication networks may be employed. Generally, duplex communication networks allow users to communicate in parallel with one another using schemes such as Time Division Multiple Access (TDMA) and Frequency Division Multiple Access (FDMA).

TDMA uses time-division multiplexing to separate incoming (received) and outgoing (transmitted) signals. Because the incoming and outgoing signals are separated in time, the signals may be carried on the same frequency.

FDMA uses transmitters and receivers that operate on different frequencies. The frequencies of the transmitted and received signals can be sufficiently separated such that their modulated frequency spectra do not overlap.

Nevertheless, there are disadvantages associated with the schemes mentioned above. For example, the efficiency of time-division multiplexing is reduced because of the need to coordinate sending and receiving, and delivery of signals may be delayed because of the need to separate the signals in time. Frequency-division multiplexing can be problematic because of the relative scarcity of frequency spectra and the growing number of users and applications.

Full Duplex (FD) operation, also known as Division Free Duplexing (DFD), is a promising alternative to the above schemes. FD or DFD devices transmit in the same time slot and at the same frequency as other devices. As a result, a wireless transceiver device may be transmitting and receiving signals at the same time and at the same frequency. Thus, a key challenge to FD or DFD operation is how to address self interference (interference between the signals transmitted by and the signals received by the transceiver device). More specifically, the transmit power ratio may be larger than zero dBm while the receive power ratio may be less than −90 dBm, a difference of a factor of more than one billion. Therefore, a key challenge to FD or DFD operation is how to address interference of a signal being transmitted on a signal at the same frequency that is being received at the same time.

SUMMARY

In one embodiment, a wireless communication device includes a transmit chain, a receive chain, and a cancellation block. The wireless device may have any combination of one or more transmit antennas and one or more receive antennas, or it may have a single antenna used for both transmitting and receiving.

The device can transmit a first signal and receive a second signal concurrently (e.g., at the same time) and within overlapping frequency bands (e.g., at the same frequency). The cancellation block can generate a third (cancellation) signal that accounts for channel characteristics (channel estimation) on the transmitted first signal. The cancellation signal can be applied to the received second signal to compensate for interference caused by the transmitted first signal.

In one embodiment, the cancellation signal is determined using a copy of the analog form of the first signal (sampled from the end of the transmit chain) and a copy of the received second signal before the cancellation signal is applied (sampled before the received second signal enters the receive chain). In another embodiment, the cancellation signal is determined using the two signals just mentioned and also using the digital form of the first signal (e.g., a copy of the first signal before that signal is processed by the transmit chain). In one such embodiment, the copy of the analog form of the first signal and the copy of the received second signal are converted to digital form upstream of the cancellation block, and the cancellation signal is thus generated in digital form using the digital form of the first signal, the digital form of the copy of the first signal, and the digital form of the copy of the received second signal. The cancellation signal is then converted to analog form. The analog form of the cancellation signal is subtracted from the analog form of the received second signal to produce a "compensated" second signal (the signal is compensated in the sense that the interference introduced by the first signal is reduced, and in particular is reduced to a level at which the receive chain is not saturated).

In one embodiment, the compensated second signal is converted from analog form to digital form and then further processed to produce a signal that has a satisfactory signal-to-noise ratio. The resulting signal can then be input to a receive baseband processor.

In one embodiment, the copy of the received second signal (sampled at the front of the receive chain) and the copy of the first signal (sampled from the end of the transmit chain) are input to the cancellation block via a feedback chain. In one embodiment, a predistorter observation path is also used for the feedback chain. Thus, in one embodiment, the feedback chain may include a predistorter, which may be a digital predistorter (DPD). By using the DPD observation path to provide feedback to the cancellation block, hardware costs can be reduced. In one such embodiment, a switch is used to select an input to the feedback chain from either the copy of the received second signal or the copy of the first signal.

In one embodiment, a predefined (known) benchmark signal is stored in memory. The benchmark signal can be transmitted by the wireless device and then used to determine an initial measure of the channel characteristics based on the digital form of the transmitted benchmark signal, a copy of the analog form of the transmitted benchmark signal, and a copy of the benchmark signal received at the wireless device. In one such embodiment, a switch is used to select an input to the transmit chain from either the memory (if the benchmark signal is to be used) or from another source (if another signal other than the benchmark signal is to be transmitted).

In implementations involving multiple transmit antennas, interference cancellation is an extension of the approaches described above. Generally speaking, a combined cancellation signal that accounts for all transmitters is generated based on feedback and channel characteristics per transmitter. In implementations involving multiple transmit antennas and multiple receive antennas, a combined cancellation signal that accounts for all transmitters is independently generated per receiver.

Embodiments according to the present disclosure introduce a number of advantages. For example, because the cancellation signal is based, at least in part, on the digital version of the signal to be transmitted (from the head of the transmit chain), the received interfering signal (that is, the transmitted signal) and cancellation signal are aligned in time. Consequently, tight time constraints do not need to be imposed on the cancellation block. Also, in one embodiment, the DPD provides information about the interfering signal after removal of transmitter distortion and dispersion effects, facilitating the cancellation of multipath effects (e.g., echoes) and improving the accuracy and efficiency of the cancellation signal. Furthermore, dispersive elements (e.g., the coupler and filter) in the receive chain can be duplicated in the cancellation signal path to mitigate computational requirements in the cancellation block. Moreover, because a known benchmark signal can be used from memory, channel estimation does not need to rely on an unknown transmit signal. Hence, assumptions do not need to be made about signal content, for example, allowing faster channel adaptation (e.g., faster adjustment of transmission parameters such as frequency).

Furthermore, computing the cancellation signal in the digital domain instead of in the analog domain improves accuracy over almost any range of frequencies; hence, bandwidth is not restricted in comparison to existing solutions. Also, additional antennas, radiation patterns, and beamforming are not needed for interference cancellation, meaning that embodiments according to the present invention can be simpler, less costly, and smaller than existing solutions.

In general, embodiments according to this disclosure provide a solution to the problem of self interference during FD or DFD operation, facilitating such operation and thus helping to address the larger issues associated with schemes such as TDMA and FDMA.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

For simplicity of discussion, the discussion below refers to signals in the singular. That discussion can readily be extended to groups or bursts of signals. A burst is a symbol or series of symbols of predefined duration and unique to a specific air interface.

Implementations that Use One Antenna, or One Transmit and One Receive Antenna

Figure 1A:
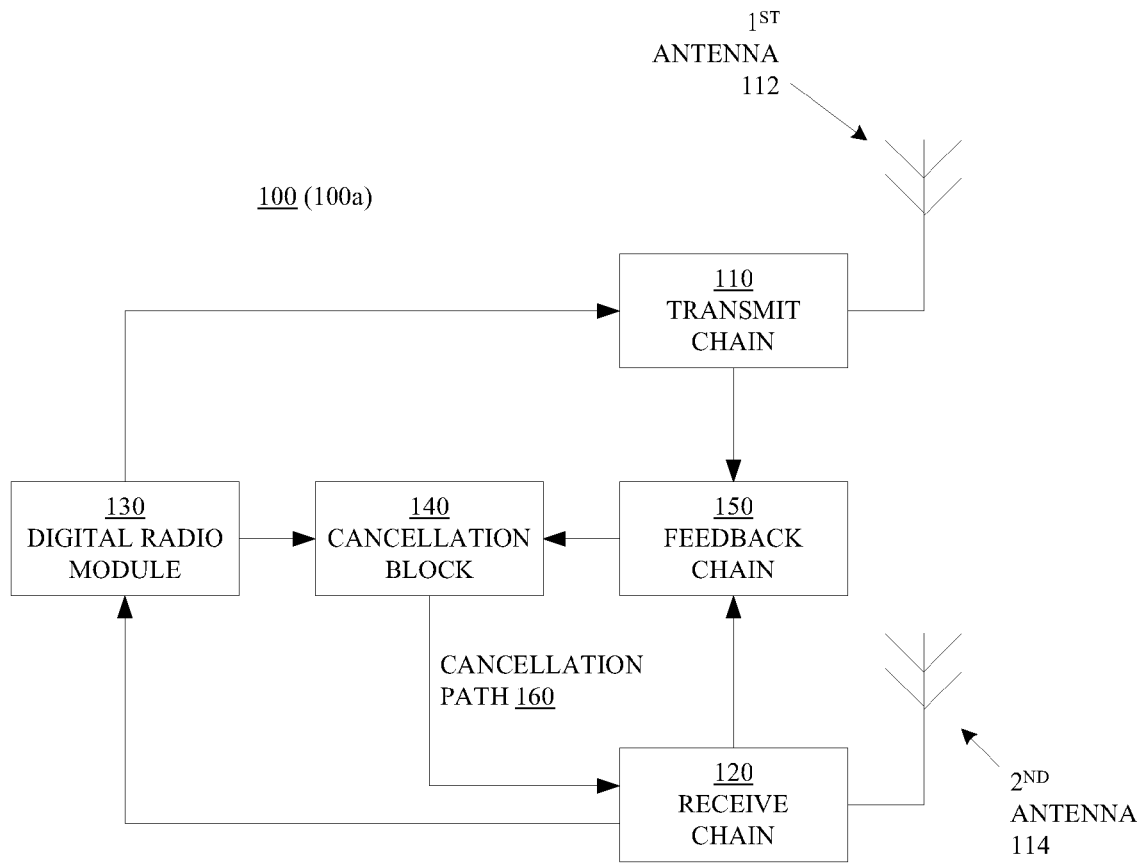
FIG. 1A is a block diagram of an example of a wireless radio frequency (RF) transceiver device upon which embodiments according to the present disclosure can be implemented.

FIG. 1A is a block diagram of an example of a wireless radio frequency (RF) transceiver device 100 upon which embodiments according to the present disclosure may be implemented. The device 100 (100a) includes a transmit chain 110 and a receive chain 120. In the example of FIG. 1A, the transmit chain 110 is coupled to a first antenna 112, and the receive chain 120 is coupled to a second antenna 114. That is, the device 100a is a single-input, single-output (SISO) device.

The device 100a can include input and output interfaces such as those found in, for example, a wireless handheld device such as a cell phone or computer system. The device 100a can also include components other than those shown in FIG. 1A, such as but not limited to a central processing unit, memory, and a display.

A digital radio module 130 is coupled to the transmit and receive chains. The module 130, among other functions that are known in the art and thus are not discussed in this disclosure, performs digital signal processing to convert between digital radio signals and analog RF signals. There may be two such modules, one for the transmit chain 110 and one for the receive chain 120.

In one embodiment, the module 130 interfaces, on one side, with the transmit chain 110 and the receive chain 120. On another side, the module 130 can interface with a baseband processing element via a digital up and down converter. In one embodiment, the baseband processing/radio interface is implemented according to the Common Public Radio Interface (CPRI) or equivalent.

In the example of FIG. 1A, the device 100a includes a cancellation block 140 and a feedback chain 150. As will be described in more detail below, the feedback chain 150 provides copies of signals from the transmit and receive chains to the cancellation block 140. More specifically, the feedback chain 150 provides, to the cancellation block 140, a copy of the original (first) signal to be transmitted after that signal has been processed by the transmit chain 110. The first signal is then transmitted, and the feedback chain 150 provides a copy of a (second) signal that has been received by the device 100a before the second signal has been processed by the receive chain 120, where the second signal was received within the same time frame and within the same frequency band as the transmitted first signal. The cancellation block 140 uses those signals in combination with the original signal to be transmitted (e.g., a signal from the module 130 or a known benchmark signal, before the signal was processed by the transmit chain 110) to generate a cancellation signal. The cancellation signal is supplied to the receive chain 120 via a cancellation path 160. The cancellation signal can be used to compensate for self interference (interference between the signal transmitted by and the signal received by the device 100a).

Figure 1B:
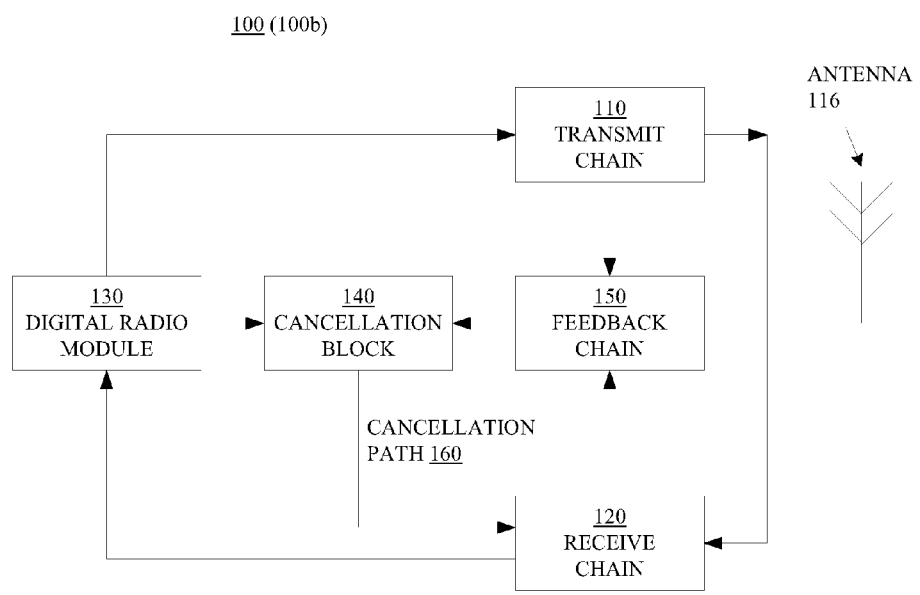
FIG. 1B is a block diagram of another example of a wireless RF transceiver device upon which embodiments according to the present disclosure can be implemented.

FIG. 1B is a block diagram of another example of a wireless RF transceiver device 100 (100b) upon which embodiments according to the present disclosure may be implemented. In contrast to the example of FIG. 1A, the transmit chain 110 and the receive chain 120 in the device 100b are both coupled to the same antenna 116. That is, the device 100b includes a single antenna 116 that is used for both transmitting and receiving.

Figure 2A:
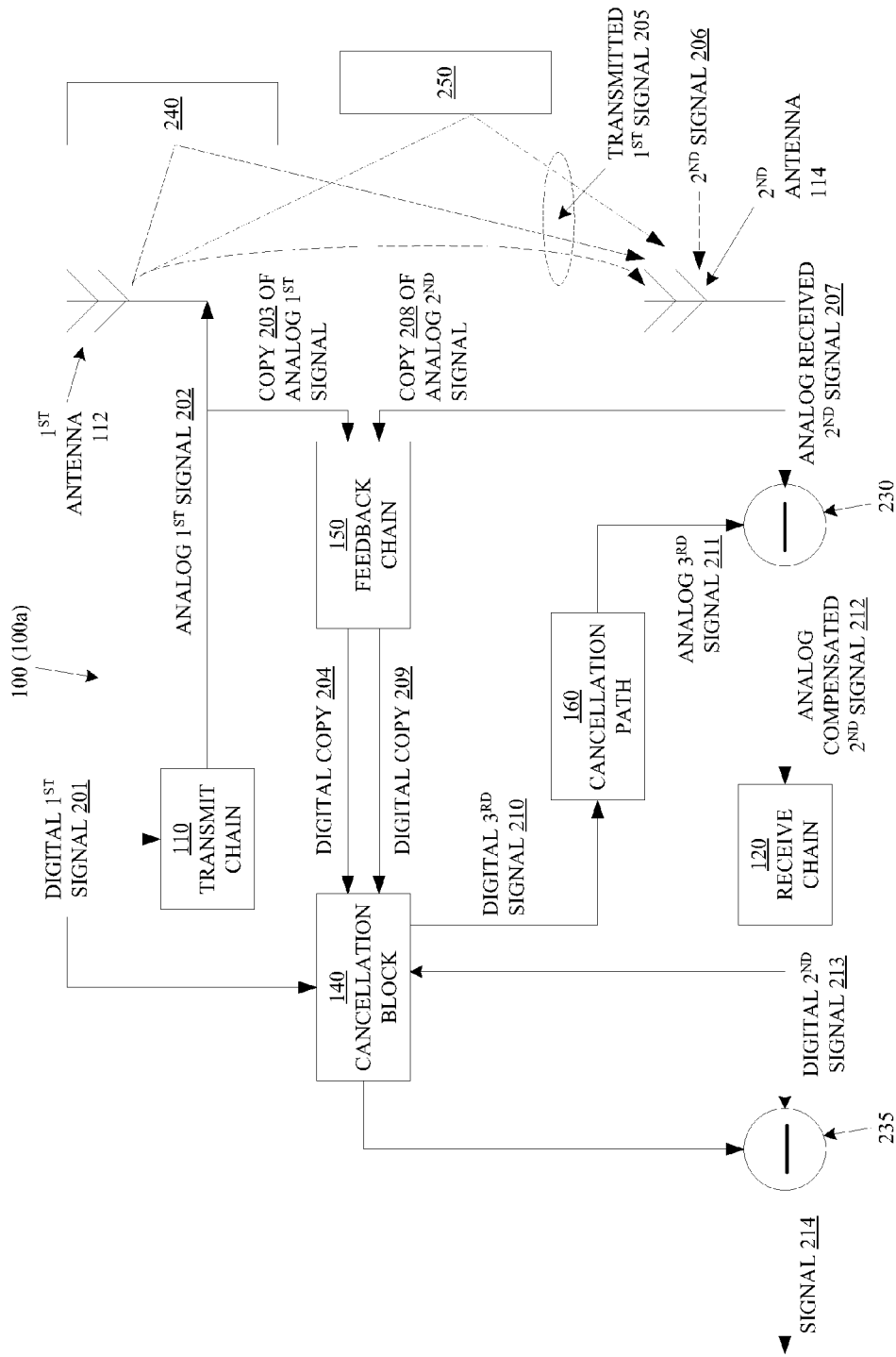
FIG. 2A is a block diagram showing the flow of signals to, from, and within a wireless RF transceiver device in an embodiment according to the present disclosure.

FIG. 2A is a block diagram showing the flow of signals to, from, and within the device 100a (FIG. 1A) in an embodiment according to the present disclosure. In the FIG. 2 embodiment, the device 100a is used for Full Duplex (FD) operation, also known as Division Free Duplexing (DFD). In general, the device 100a can send and receive signals within the same time frame (e.g., concurrently, or in parallel) and within the same frequency band (e.g., at or about the same frequency).

In the example of FIG. 2A, the transmit chain 110 receives a first signal 201 in digital form. The digital first signal 201 can be received from the module 130 (FIG. 1A) or from memory (see FIG. 3, below). The digital first signal 201 is converted to analog form (analog first signal 202) by the transmit chain 110. The analog first signal 202 can then be transmitted via the first antenna 112.

Continuing with reference to FIG. 2A, a copy 203 of the analog first signal 202 is received by the feedback chain 150, which converts the signal to digital form (digital copy 204). The digital copy 204 of the first signal is then received at the cancellation block 140. The cancellation block 140 also receives the digital first signal 201. Thus, the cancellation block 140 receives both the original digital signal 201 that is to be transmitted (before the signal 201 enters the transmit chain 110) and a digital copy 204 of the signal to be transmitted after processing in the transmit chain.

During transmission, the analog first signal 202 will reach the device 100 (e.g., at the second antenna 114) along multiple paths because of, for example, reflection from objects (natural and man-made) such as objects 240 and 250. The multipath effects can cause the properties of a transmitted signal to change, which can result in multiple pulses per signal that are received at different times at the device 100. In FIG. 2A, the transmitted first signal 205 represents, essentially, the cumulative version of those pulses over time. Concurrent with the arrival of the transmitted first signal 205 at the device 100a, a second signal 206 can also be received at the device 100. The second signal 206 may be transmitted from another wireless device or from a wireless node (e.g., a base station) in a communications network, for example. In FD or DFD operation, the second signal 206 can be within the same frequency band as the transmitted first signal 205. As such, the transmitted first signal 205 can interfere with the second signal 206. In FIG. 2A, the received second signal 207 represents the version of the second signal 206 that is received at the device 100. That is, the received second signal 207 includes the effects of the interference caused by the transmitted first signal 205 on the second signal 206.

In the example of FIG. 2A, a copy 208 of the received second signal 207 (which is in analog form) is received by the feedback chain 150, which converts the signal to digital form (digital copy 209). In the example of FIG. 2A, the digital copy 209 of the received second signal 207 is then received at the cancellation block 140. Thus, in the example of FIG. 2A, the cancellation block 140 also receives, in addition to the signals mentioned above, a digital copy of the signal received at the device 100 before that signal is processed by the receive chain 120.

In one embodiment, the cancellation block 140 generates a third (cancellation) signal 210 in digital form using the following inputs:
  the digital signal 201 (the original signal to be transmitted);
  the digital signal 204 (the digital signal converted from the copy 203 of the analog signal 202 that was transmitted); and
  the digital signal 209 (the digital signal converted from the copy 208 of the analog received second signal 207).

To generate the cancellation signal 210, in one embodiment, the cancellation block 140 uses the above inputs for channel estimation. That is, the cancellation block 140 approximates the effects of the channel on the transmitted first signal 205 between the first antenna 112 and the second antenna 114. Channel effects include, for example, the multipath effects mentioned above. The cancellation block 140 then compensates for those effects. The cancellation signal 210 is essentially the inverse of the transmitted first signal 205 as it is received at the device 100a.

In other embodiments, not all of the above inputs may be used. For example, in one embodiment, interference cancellation is implemented using the signals 201, 203, and 208; in another embodiment, interference cancellation is implemented using the signals 203 and 208; and in another embodiment, interference cancellation is implemented using the signals 201 and 208.

The cancellation signal 210 originates, at least in part, on the digital portion of the transmit chain 110 because it is based, at least in part, on the digital signal 201. Accordingly, the transmitted and cancellation signals are aligned in time. The transmitted signal can be delayed to account for processing time in the cancellation block. The cancellation signal is constructed from the same time sequence that is transmitted as each burst is unique and the transmitter-to-receiver propagation delay may be smaller than the time needed to generate a cancellation signal. Consequently, the propagation time from the antenna 112 to the antenna 114 does not impose a fixed time limit on the cancellation block 140 with regard to generating a cancellation signal that can be aligned in time with the interfering signal.

The cancellation signal 210 in digital form is converted to an analog signal 211 in the cancellation path 160, then phase-aligned with and subtracted from the analog received second signal 207 at a first subtractor 230. Thus, the compensated second signal 212 is, essentially, the received second signal 207 minus the interference effects introduced by the transmitted first signal 205. In this manner, the effects of self interference for FD or DFD operation are addressed.

The resulting signal—compensated second signal 212 in analog form—is then input to the receive chain 120 for further processing. In one embodiment, the compensated second signal 212 is converted to digital form (digital second signal 213) in the receive chain 120. In one such embodiment, the digital second signal 213 is input to the cancellation block 140 for further signal processing. The result of that signal processing is subtracted from the digital second signal 213 at a second subtractor 235, so that the resulting digital signal 214 has an acceptable signal-to-noise ratio. The signal 214 can then be input into the receive baseband processor 320 (FIG. 3).

Figure 2B:
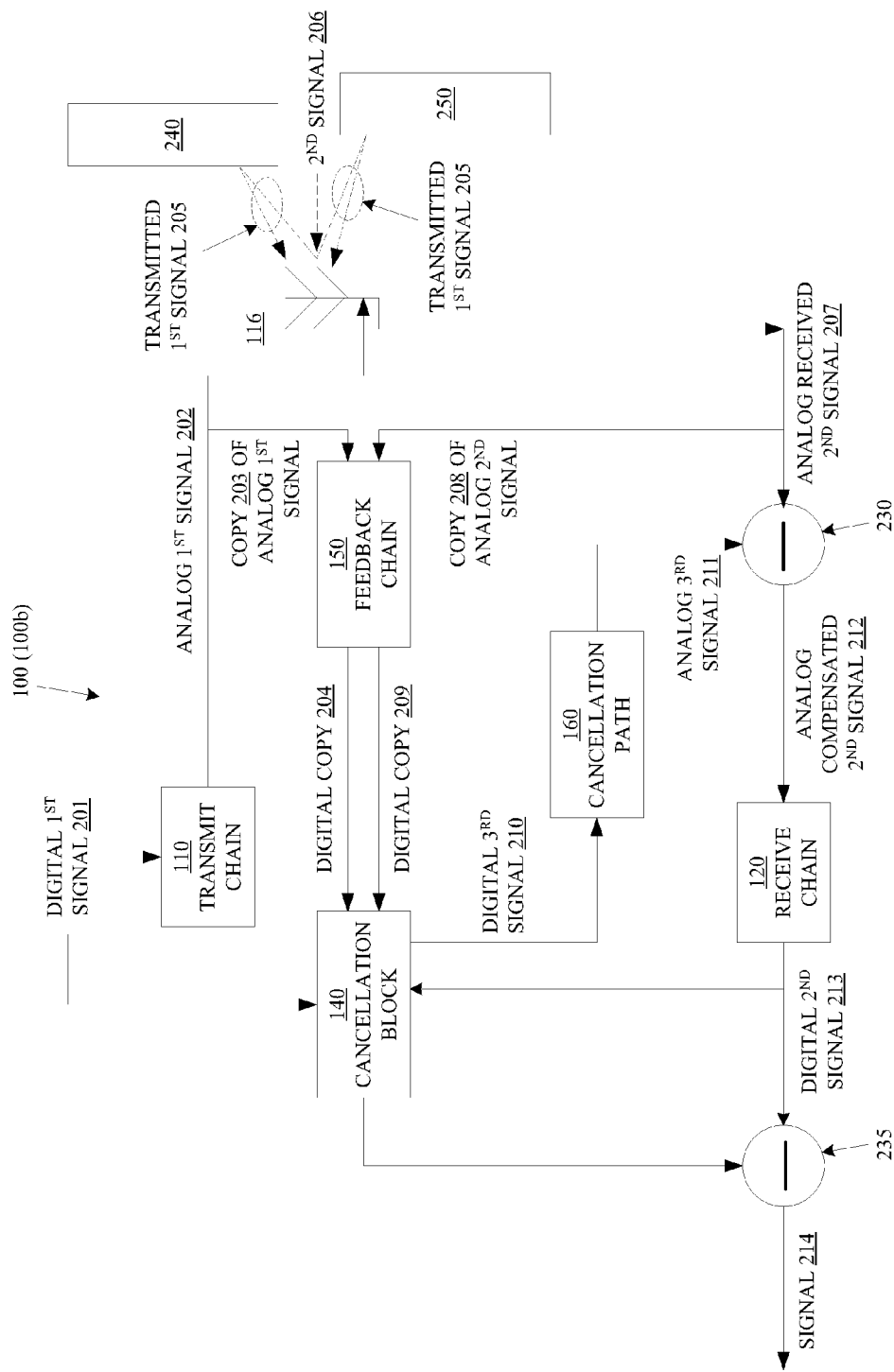
FIG. 2B is a block diagram showing the flow of signals to, from, and within a wireless RF transceiver device in another embodiment according to the present disclosure.

FIG. 2B is a block diagram showing the flow of signals to, from, and within the device 100b (FIG. 1B) in an embodiment according to the present disclosure. In the FIG. 2B embodiment, the device 100b is used for FD or DFD operation. In the example of FIG. 2B, the device 100b functions as just described in the example of FIG. 2A, except that the analog first signal 202 can be transmitted via the single antenna 116 and will be received at the same antenna 116 along multiple paths because of reflection from the objects 240 and 250.

To generate the cancellation signal 210, in one embodiment, the cancellation block 140 uses the inputs described in conjunction with FIG. 2A for channel estimation. That is, the cancellation block 140 approximates the effects of the channel on the transmitted first signal 205 at the antenna 116. Channel effects include, for example, the multipath effects mentioned above. The cancellation block 140 then compensates for those effects. The cancellation signal 210 is essentially the inverse of the transmitted first signal 205 as it is received at the device 100b. The cancellation signal 210 is generated and applied as described in conjunction with FIG. 2A.

Figure 3:
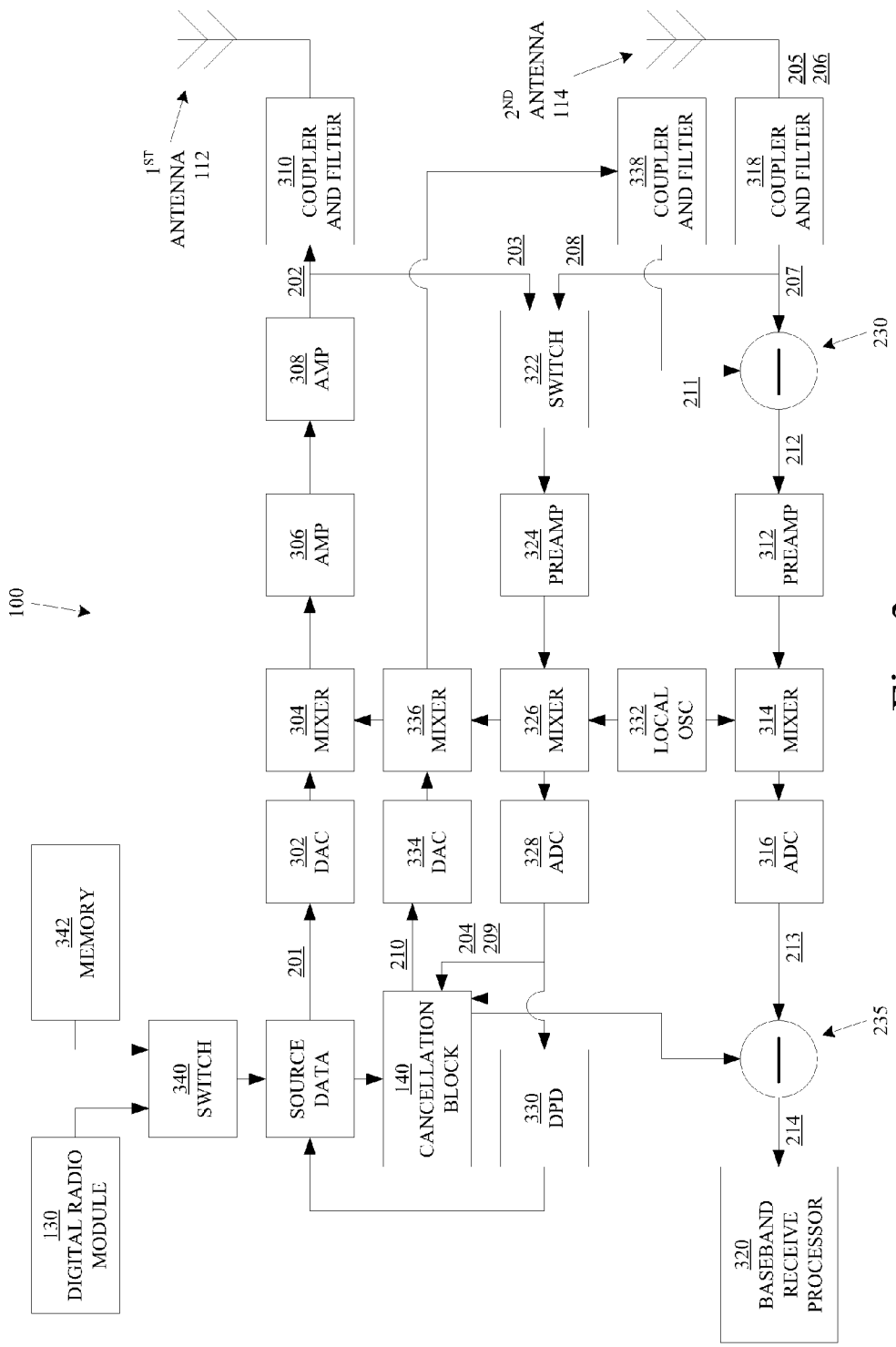
FIG. 3 is a block diagram illustrating an example of a wireless RF transceiver device that can be used to implement interference cancellation with FD or DFD operation in an embodiment according to the present disclosure.

FIG. 3 illustrates an example of a device 100 that can be used to implement interference cancellation with FD or DFD operation in an embodiment according to the present disclosure. In the discussion to follow, various elements are presented as separate components. However, the functionality provided by those separate components may be combined in various ways and implemented as one or more different components. Furthermore, the device 100 may include elements and functionalities other than those described, and may include alternatives to those elements.

In the example of FIG. 3, the transmit chain 110 includes a digital-to-analog converter (DAC) 302, a mixer 304, and amplifiers 306 and 308. A coupler and filter 310 is located between the transmit chain 110 and the first antenna 112. The analog copy 203 of the first signal is sampled downstream of (after) the transmit chain 110 before the coupler and filter 310.

In the example of FIG. 3, the receive chain 120 includes a preamplifier 312, a mixer 314, and an analog-to-digital converter (ADC) 316. A coupler and filter 318 is located between the second antenna 114 and the first subtractor 230. The analog copy 208 of the received second signal is sampled upstream of (before) the first subtractor 230 after the coupler and filter 318. The second subtractor 235 is downstream of the receive chain 120. The output of the second subtractor 235 can be input to the receive baseband processor 320 via the module 130.

As mentioned above, the transmit chain 110 and the receive chain 120 can both be connected to the same antenna.

In the example of FIG. 3, the feedback chain 150 utilizes the digital predistorter observation path that is included in many contemporary types of transceivers. Accordingly, in the example of FIG. 3, the feedback chain 150 includes a switch 322, a preamplifier 324, a mixer 326, an ADC 328, and a digital predistorter (DPD) 330. The DPD 330 has the inverse response of the amplifiers (power amplifiers) 306 and 308 so that the input from the feedback chain 150 to the cancellation block 140 will be linear. The DPD 330 provides a copy of the signal 209, facilitating the cancellation of multipath effects (e.g., echoes) and thus reducing the computational load on the cancellation block 140, and also improving the accuracy and efficiency of the cancellation signal 210. The switch 322 is used to select an input for the feedback chain 150 from among either the copy 203 of the first signal or the copy 208 of the second signal. In one embodiment, a local oscillator 332 is coupled to both the mixer 314 and the mixer 326.

Utilizing the DPD observation path (e.g., the path from the switch 322 through the ADC 328 to the DPD 330) in the manner just described reduces costs by relying on existing components to implement more than one function. That is, in the example of FIG. 3, the feedback chain 150 is used both as the DPD observation path and to provide feedback to the cancellation block 140 for the purpose of interference cancellation. As an alternative to the example of FIG. 3, two parallel chains or paths can be utilized—one as the DPD observation path, and one to provide feedback to the cancellation block 140. There is considerable synergy between DPD observation and interference cancellation, allowing the DPD observation path to be shared with the cancellation block 140 as just described. Furthermore, timing alignment functions used for the DPD can be shared with the cancellation block 140 and thus do not need to be duplicated for interference cancellation.

In the example of FIG. 3, the cancellation path 160 includes a DAC 334, a mixer 336, and a coupler and filter 338. By duplicating dispersive elements (e.g., the coupler and filter) that are in the receive chain 120 in the cancellation signal path 160, computational requirements in the cancellation block 140 can be mitigated.

In one embodiment, the device 100 includes a second switch 340 coupled between a memory 342, the transmit chain 110, and the module 130. As mentioned above, the module 130 can be the source of a signal to be transmitted by the device 100. Alternately, a known or benchmark signal can be predetermined and stored in the memory 342. The switch 340 is used to select a source for the transmit chain 110 from among either the memory 342 or the module 130. The module 130 is selected as the source for normal operation. The memory 342 can be selected as the source in order to initialize the cancellation block 140. That is, a known benchmarking signal can be accessed from the memory 342 and used for initial channel estimation in lieu of a signal from the module 130.

The discussion above is based on the example of the device 100 that utilizes multiple antennas 112 and 114 (e.g., the device 100a of FIG. 2A). However, that discussion can be readily adapted to implementations that utilize a single antenna 116 (e.g., the device 100b of FIG. 2B). For example, referring to FIG. 3, if the antennas 112 and 114 are replaced with a single antenna, then the functionality provided by the couplers and filters 310 and 318 can be replaced with a single coupler and filter that receives the signal 202 as an input when the device 100 is transmitting, and outputs the signal 207 when the device 100 is receiving.

Figure 4:
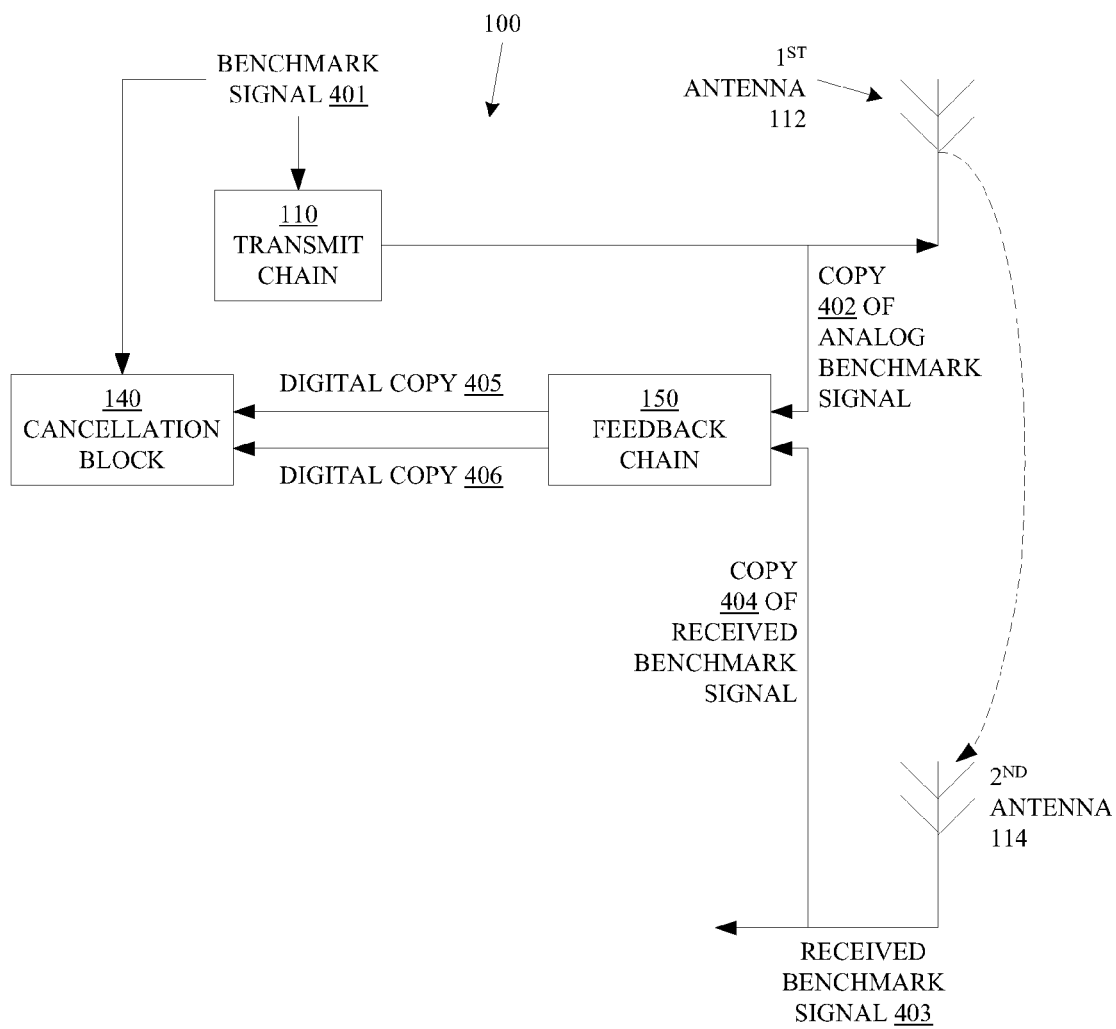
FIG. 4 is a block diagram illustrating the use of a benchmark signal to initialize a cancellation block in a wireless RF transceiver device in an embodiment according to the present disclosure.

With reference to FIG. 4, a benchmark signal 401 in digital form is accessed from the memory 342 (FIG. 3) and, in one embodiment, is input to the cancellation block 140 and to the transmit chain 110, where it is converted to analog form. A copy 402 of the analog form of the benchmark signal is input to the cancellation block 140 via the feedback chain 150, where the copy 402 is converted into digital form (digital copy 405).

In the example of FIG. 4, the analog form of the benchmark signal is transmitted via the first antenna 112 and is received at the second antenna 114 (received benchmark signal 403). As mentioned above, in the embodiment of FIG. 1B, the benchmark signal can be transmitted and received at the same antenna. A copy 404 of the analog form of the received benchmark signal 403 is also input to the cancellation block 140 via the feedback chain 150, where the received benchmark signal is converted to digital form (digital copy 406). The cancellation block 140 can then use the benchmark signal 401, the digital form 405 of the copy 402, and the digital form 406 of the received benchmark signal 403 for channel estimation. As a result, the cancellation signals 210 (digital) and 211 (analog) can be generated more quickly and with reduced processing requirements, as the channel (propagation characteristics) can be assessed with a known signal with characteristics specifically selected to facilitate timing alignment.

In other embodiments, not all of the above benchmark signals may be used. For example, in one embodiment, benchmarking is implemented using the signals 401, 402, and 404; in another embodiment, benchmarking is implemented using the signals 402 and 404; and in another embodiment, benchmarking is implemented using the signals 401 and 404.

Figure 5:
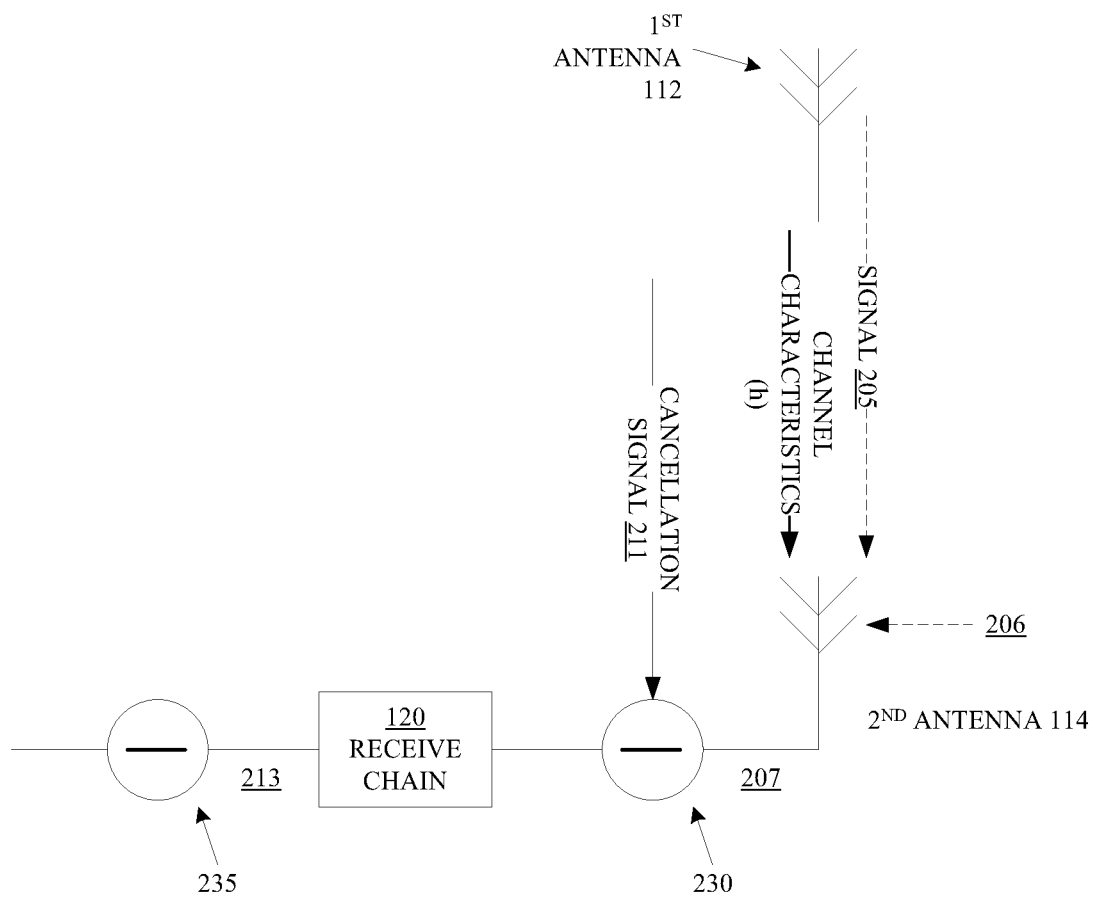
FIG. 5 is a block diagram illustrating RF interference cancellation in an embodiment according to the present disclosure.

FIG. 5 is a block diagram illustrating RF interference cancellation in an embodiment according to the present invention. FIG. 5 is discussed with reference to the signals and elements described above in conjunction with FIGS. 2A, 2B, and 3. In the example of FIG. 5, a signal 205 is transmitted from the first antenna 112 and is received at the second antenna 114. Similarly, in the FIG. 1B embodiment, the signal 205 can be transmitted from the antenna 116 and, due to channel effects (reflection, etc.), the signal 205 will also be received at the antenna 116. The version of the signal 205 that arrives at the device 100 is affected by the characteristics 'h' of the channel/path travelled by the signal.

As mentioned previously herein, the power ratio of the signal 205 is much larger (on the order of a billion times larger) than the power ratio of another signal 206 received at the device 100. In FD or DFD operation, the signals 205 and 206 arrive at the device 100 within the same timeframe and within the same frequency band, and thus the signal 205 can overwhelm the signal 206 if not cancelled out. At subtractor 230, the cancellation signal 211 is applied to the signal 207 (which represents, in essence, the signal 206 including the interfering signal 205) in order to restore the signal 207 to the dynamic range of the receive chain 120. Otherwise, considering the magnitude of the interference component of the signal 207, the receive chain 120 would be saturated. At the subtractor 235, a known signal processing technique can be applied to remove residual interference from the signal 213.

Figure 6:
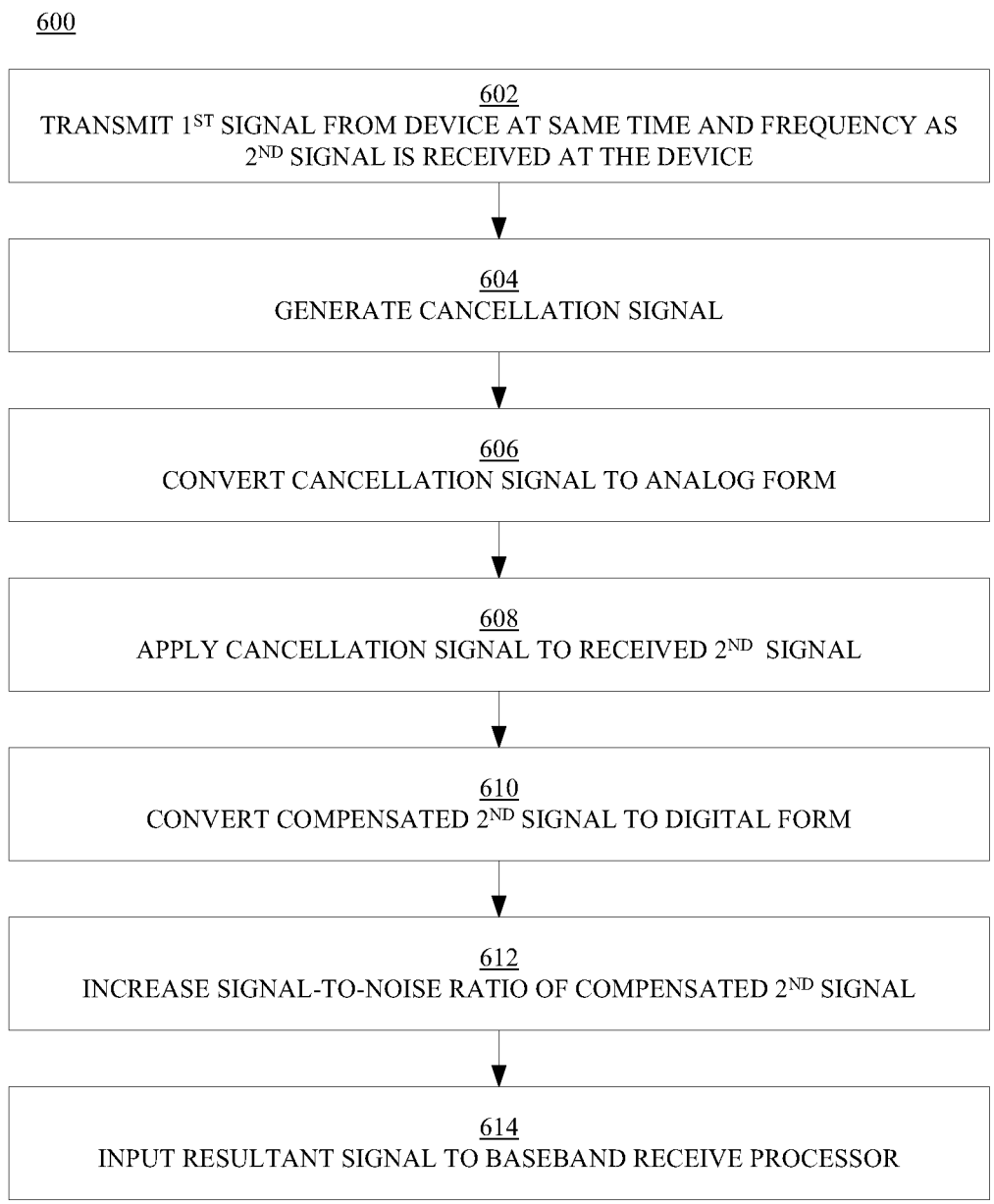
FIG. 6 is a flowchart of an example of a method for cancelling interference during FD or DFD wireless communication in an embodiment according to the present disclosure.

FIG. 6 is a flowchart 600 of a method for wireless communication in an embodiment according to the present disclosure. Specifically, the flowchart 600 illustrates a method for cancelling interference during FD or DFD operation. Although specific steps are described by the flowchart 600, the method is not limited to those steps or the order in which the steps are described. In one embodiment, the method described by the flowchart 600 is implemented using the device 100 of FIG. 1A or 1B. FIG. 6 is discussed with reference to elements of FIGS. 2A and 2B.

In block 602 of FIG. 6, a first signal (205) is transmitted from a wireless device.

In block 604, a cancellation signal (210) is generated. The cancellation signal accounts for channel characteristics on the transmitted first signal. The cancellation signal is generated in digital form using inputs that include, in one embodiment, the digital form (201) of the first signal, the digital form (204) of a copy (203) of the analog form (202) of the first signal, and the digital form (209) of a copy (208) of a second signal (206, 207) received at the wireless device, where the first signal transmitted and the second signal are received concurrently (e.g., at the same time) within overlapping frequency bands.

In other embodiments, the cancellation signal is generated using the signals 201, 203, and 208, or using the signals 203 and 208, or using the signals 201 and 208.

In one embodiment, with reference also to FIG. 4, a predefined benchmark signal 401 is accessed from memory. In one such embodiment, the benchmark signal is transmitted from the device 100 to determine an initial measure of the channel characteristics using the digital form of the benchmark signal 401, a copy (402) of the analog form of the benchmark signal converted to digital form (405), and a copy (404) of the benchmark signal 403 received at the device 100 and converted to digital form (406). In other embodiments, benchmarking is implemented using the signals 401, 402, and 404, or using the signals 402 and 404, or using the signals 401 and 404.

In block 606 of FIG. 6, the cancellation signal is converted to analog form (211).

In block 608, the analog form of the cancellation signal is applied to (e.g., subtracted from) the received second signal to compensate for interference between the transmitted first signal and the second signal.

In block 610, the resultant compensated second signal (212) is converted from analog form to digital form (213).

In block 612, the digital form of the compensated second signal is further processed to produce a third signal (214) that has a signal-to-noise ratio within a specified range.

In block 614, the third signal is input to a receive baseband processor.

Figure 7:
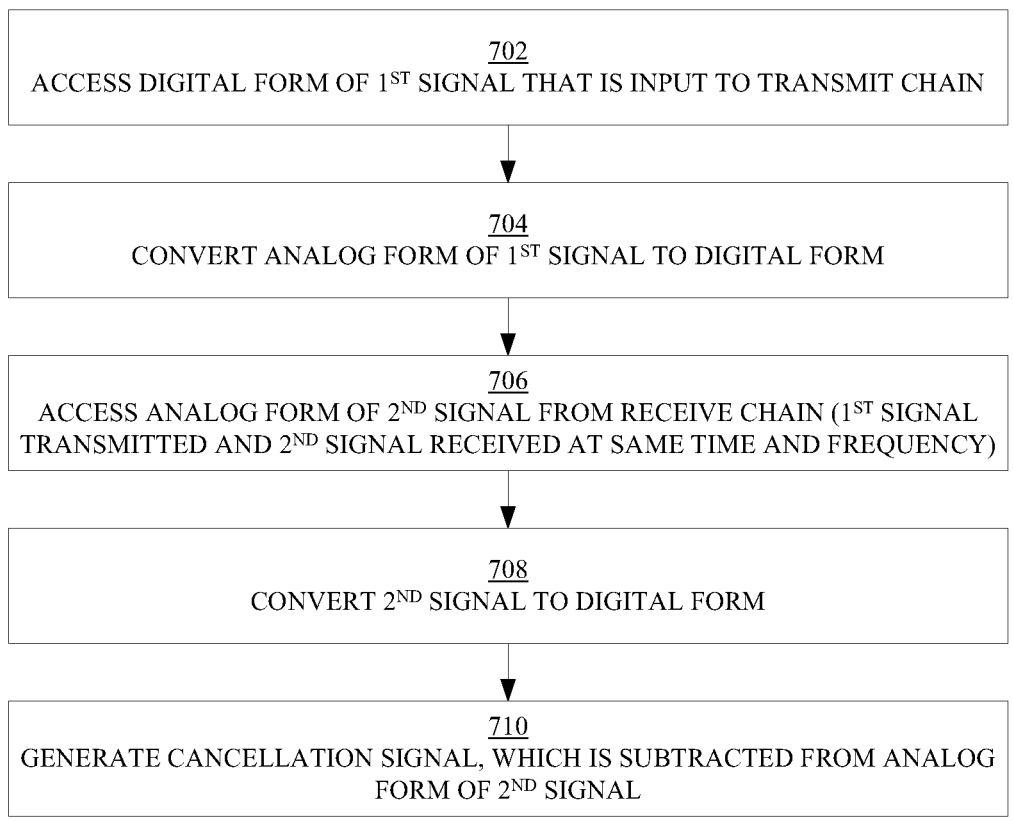
FIG. 7 is a flowchart of a method for generating a cancellation signal during FD or DFD wireless communication in an embodiment according to the present disclosure.

FIG. 7 is a flowchart 700 of a method for wireless communication in an embodiment according to the present disclosure. Specifically, the flowchart 700 illustrates a method for generating a cancellation signal that can be used to address the problem of self interference during FD or DFD operation. Although specific steps are described by the flowchart 700, the method is not limited to those steps or the order in which the steps are described. In one embodiment, the method described by the flowchart 700 is implemented using the cancellation block 140 including the feedback chain 150 of FIGS. 1A and 1B. FIG. 7 is discussed with reference to elements of FIGS. 2A and 2B.

In block 702 of FIG. 7, a digital form (201) of a first signal that is an input to a transmit chain of a wireless device is accessed. The transmit chain converts the first signal to analog form (202).

In block 704, a copy (203) of the analog form of the first signal is converted to digital form (204).

In block 706, the analog form (208) of a second signal (207) is accessed from a receive chain of the wireless device, where the first signal is transmitted and the second signal is received concurrently within overlapping frequency bands.

In one embodiment, with reference also to FIG. 4, the first signal is a predefined benchmark signal 401 from memory, and the second signal is the benchmark signal as it is received (403) at the receive chain.

In block 708 of FIG. 7, the analog form of the received second signal is converted to digital form (209).

In block 710, a third (cancellation) signal (210) that accounts for channel characteristics on the transmitted first signal is generated. In one embodiment, the third signal is generated in digital form using the digital form (201) of the first signal, the digital form (204) of the copy (203) of the analog form (202) of the first signal, and the digital form (209) of the copy (208) of the received second signal (207). In other embodiments, the third signal is generated using the signals 201, 203, and 208, or using the signals 203 and 208, or using the signals 201 and 208.

The third signal is then converted to analog form (211) and subtracted from the received second signal to compensate for interference caused by the transmitted first signal, producing a compensated second signal (212). The compensated second signal can be converted from analog form to digital form (213) and then further processed to produce a fourth signal (214) that has a signal-to-noise ratio within a specified range. The fourth signal can then be input to a receive baseband processor.

In summary, a cancellation signal can be determined based on a combination of some or all of the following signals: the signal to be transmitted, sampled before the signal is processed in the transmit chain; a copy of the signal to be transmitted after processing in the transmit chain; and a copy of the received signal before the signal is processed in the receive chain. The cancellation signal can then be subtracted from the received signal, to remove any interference from the first signal included in the second signal. Thus, embodiments according to this disclosure provide a solution to the problem of self interference during FD or DFD operation, facilitating such operation and thus helping to address the larger issues associated with schemes such as TDMA and FDMA.

Implementations that Use Multiple Transmit Antennas

Figure 8:
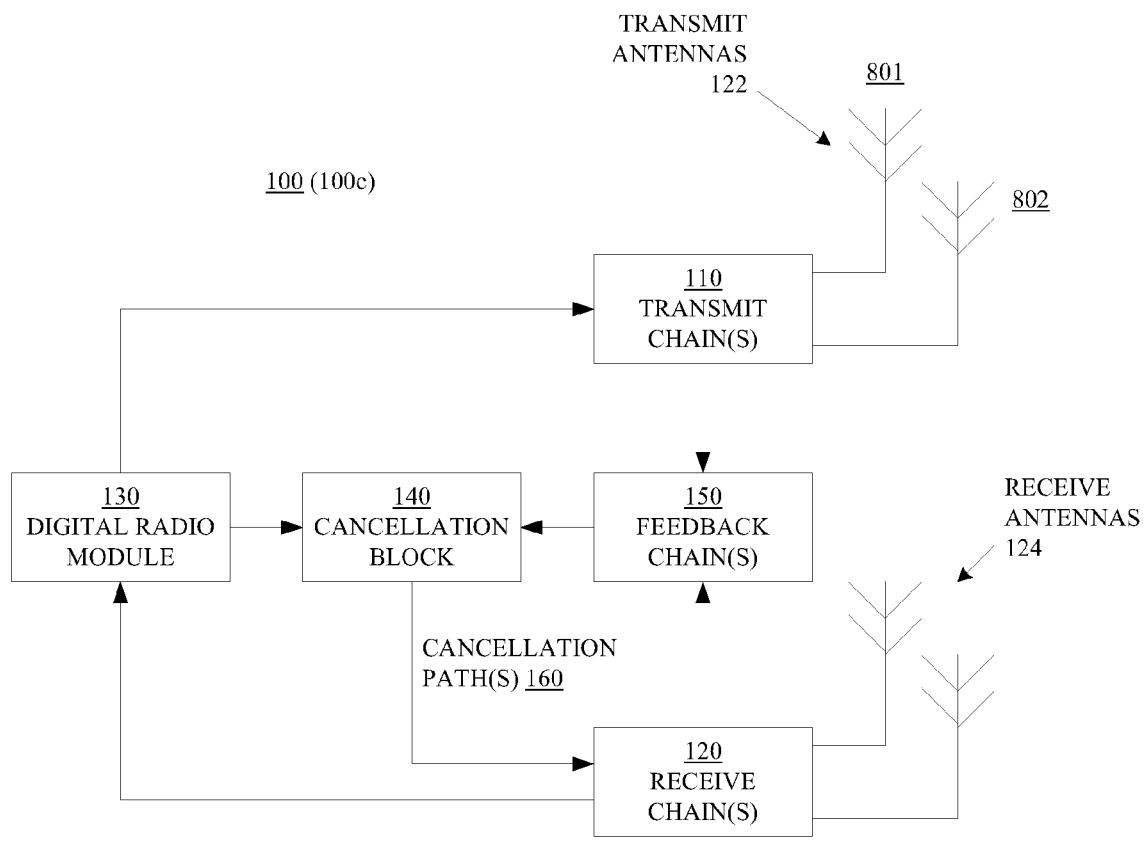
FIG. 8 is a block diagram of another example of a wireless RF transceiver device upon which embodiments according to the present disclosure can be implemented.

FIG. 8 is a block diagram of another example of a wireless RF transceiver device 100 (100c) upon which embodiments according to the present disclosure can be implemented. In contrast to the examples of FIGS. 1A and 1B, the device 100c includes multiple transmit antennas 122 (the antennas 801 and 802) and multiple receive antennas 124. That is, the device 100c is a multiple-input, multiple-output (MIMO) device. Although two transmit antennas and two receive antennas are shown, the present disclosure is not so limited. In the FIG. 8 embodiment, the device 100c is used for FD or DFD operation.

In general, embodiments according to the present disclosure can be implemented on various combinations of the types of devices described in FIGS. 1A, 1B, and 8. For example, in addition to the implementations described above, the wireless transceiver device 100 can be implemented as a single-input, multiple-output (SIMO) device or as a multiple-input, single-output (MISO) device. SIMO is also known as transmit diversity.

Figure 9:
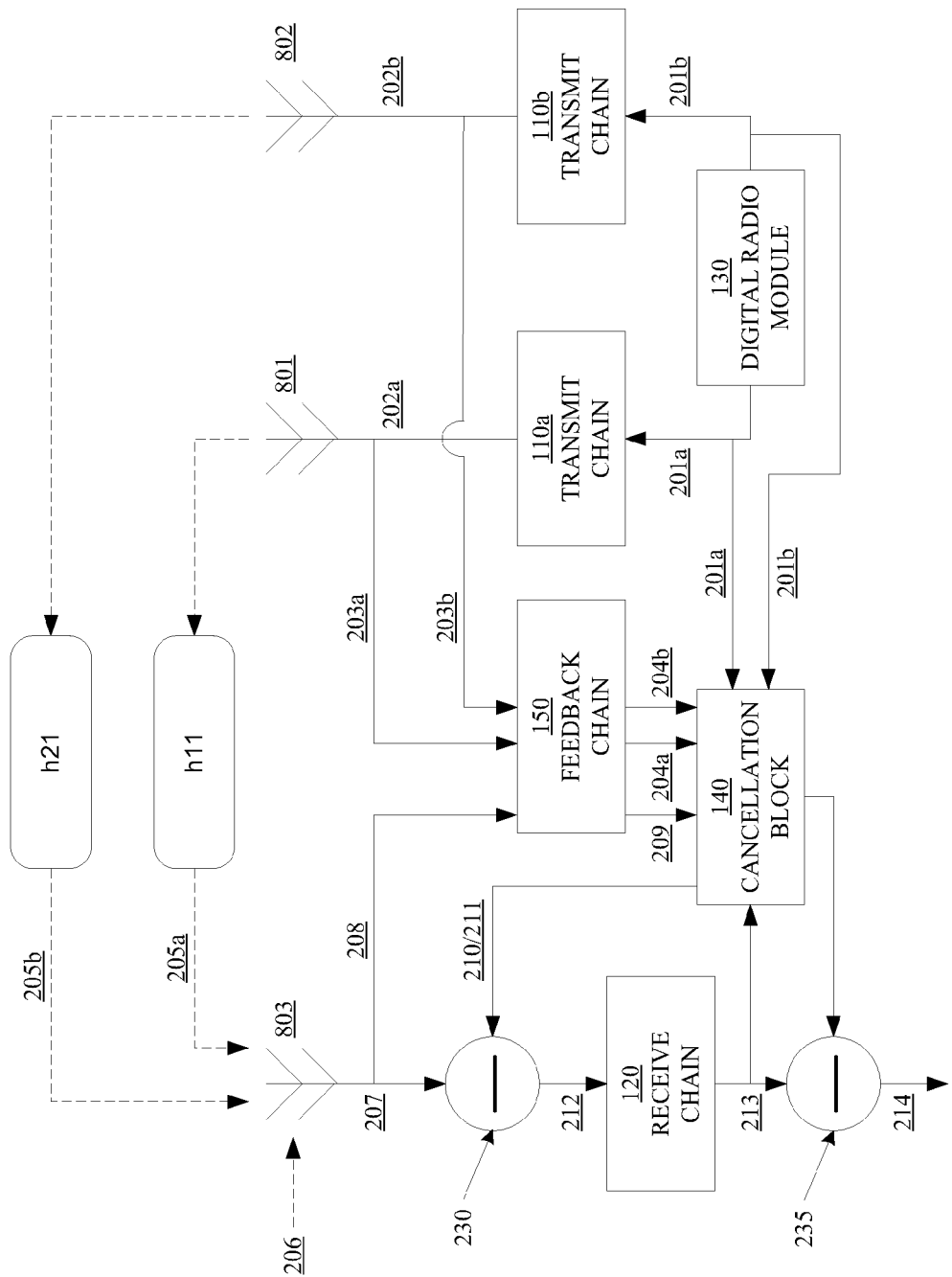
FIG. 9 is a block diagram illustrating RF interference cancellation in an embodiment according to the present disclosure.

FIG. 9 is a block diagram illustrating RF interference cancellation in the device 100c an embodiment according to the present disclosure. For ease of comparison and discussion, signals in FIG. 9 are labeled with reference number similar to those used for analogous signals in FIGS. 2A and 2B.

In the example of FIG. 9, the transmit chain 110a receives a digital signal 201a, and the transmit chain 110b receives a digital signal 201b. The digital signals 201a and 201b can be received from the module 130 or from memory as previously described herein. The digital signals 201a and 201b are converted to analog form (analog signals 202a and 202b, respectively) by the transmit chains. The signal 202a can then be transmitted via the first antenna 801, and the signal 202b can then be transmitted via the second antenna 802. Each transmitted signal has a known time sequence (known because they are transmitted by the same device 100c). The transmitted signals are independent of one another (de-correlated).

Copies 203a and 203b of the signals 202a and 202b, respectively, are received by the feedback chain 150, which converts the signals to digital form (signals 204a and 204b, respectively). There may be multiple feedback chains (in parallel to one another), or there may be a single feedback chain that is switched back and forth between the transmit chains 110a and 110b. The signals 204a and 204b are then received at the cancellation block 140. The cancellation block 140 also receives the signals 201a and 201b.

During transmission, the signal 202a will reach the device 100c (e.g., at the receive antenna 803) along multiple paths as previously described herein. Similarly, the signal 202b will reach the receive antenna 803 along multiple paths. In the example of FIG. 9, the channel (path) characteristics h11 between the first transmit antenna 801 and the receive antenna 803 will be different from the channel (path) characteristics h21 between the second transmit antenna 802 and the receive antenna 803. Prudent implementation will block the line-of-sight path between the transmit antennas 801 and 802 and the receive antenna 803. The signal 205a represents the signal 202a that is received at the antenna 803 including the effects of the channel characteristics h11, and the signal 205b represents the signal 202b that is received at the antenna 803 including the effects of the channel characteristics h21.

Concurrent with the arrival of the transmitted signals 205a and 205b at the device 100c, a signal 206 can also be received at the device 100c as previously described herein. In FIG. 9, the signal 207 includes the effects of the interference caused by the signals 205a and 205b on the signal 206.

As described previously herein, a copy 208 of the signal 207 is received by the feedback chain 150, which converts the signal to digital form (the signal 209). The signal 209 is then received at the cancellation block 140. In one embodiment, the cancellation block 140 can then generate a cancellation signal 210 in digital form using the signals 201a and 201b, the signals 204a and 204b, and the signal 209.

More specifically, in one embodiment, the cancellation signal 210 can be determined as follows. In the example of FIG. 9, the signal R (e.g., the signal 207) that is received by the device 100c can be expressed as:

$$R = rx + h11*TX1 + h21*TX2 + N; \quad (1)$$

where rx is the signal (e.g., the signal 206) received from a distant transmitter or transmitters; N is noise (generally, additive white Gaussian noise); TX1 corresponds to the signal transmitted from the antenna 801 and h11*TX1 corresponds to the effect of the signal 205a on R; and TX2 corresponds to the signal transmitted from the antenna 802 and h21*TX2 corresponds to the effect of the signal 205b on R. In the example of FIG. 9, the cancellation signal C (e.g., the signal 210) can be expressed as:

$$C = (-h11*TX1) + (-h21*TX2). \quad (2)$$

Equations (1) and (2) can be readily extended to cover implementations that utilize more than two transmit antennas. Specifically, if there is a third transmit antenna, then a term h31*TX3 is added to equation (1) and a term (−h31*TX3) is added to equation (2).

The cancellation signal 210 in digital form is converted to an analog signal 211, then phase-aligned with and subtracted from the signal 207 at a first subtractor 230. Because the signals 202a and 202b are de-correlated, the cancellation signal 210/211 can be based on the linear superposition of the transmitted signals. In this manner, the effects of self interference for FD or DFD operation are addressed.

In an implementation in which there are multiple receive antennas 124 (FIG. 8), a cancellation signal as just described is determined independently for each receive antenna. If there are two transmit antennas and two receive antennas, for example, a first cancellation signal is generated for the first receive antenna considering characteristics of the channels between the first and second transmit antennas and the first receive antenna as described above, and a second cancellation signal is generated for the second receive antenna considering characteristics of the channels between the first and second transmit antennas and the second receive antenna in a manner similar to that described above.

With reference back to FIG. 8, depending on the implementation, there may be one or more transmit chain(s) 110, one or more receive chain(s) 120, one or more cancellation block(s) 140, one or more feedback chain(s) 150, and one or more cancellation path(s) 160. That is, each of these elements can be implemented in redundant fashion, on a per-antenna basis. Alternatively, each of these elements may share some or all of the components, on a per-chain basis. In other words, for example, there may be multiple, independent cancellation blocks, one per receive antenna; or there may be multiple cancellation blocks, one per receive antenna, that share some components; or there may be a single cancellation block for all receive antennas that is switched between the receive antennas. The approach used to implement the various functional blocks 110, 120, 140, 150, and 160 in a MIMO, SIMO, or MISO implementation is a matter of design choice based on factors such as cost, efficiency, and size.

Although the present disclosure and its advantages have been described in detail, it should be understood that various changes, substitutions, and alterations can be made without departing from the spirit and scope of the disclosure as defined by the appended claims.

What is claimed is:

1. A device comprising:
a transmit chain operable for receiving an input comprising a first digital form of a first signal and for converting the first digital form of the first signal into an analog form of the first signal;
a receive chain; and
a cancellation block coupled to the receive chain and the transmit chain, wherein the transmit chain is further operable for transmitting the analog form of the first signal while a second signal is being received by the receive chain in a frequency band that overlaps a frequency band used for transmitting the first signal, wherein the cancellation block is operable for generating a third signal that accounts for interference between the first signal transmitted by the transmit chain and the second signal received by the receive chain, wherein a digital form of the third signal is generated using the first digital form of the first signal that is input to the transmit chain, a second digital form of the first signal that was converted from the analog form of the first signal, and a digital form of the second signal, converted from an analog form of the second signal received by the receive chain, and wherein the receive chain is operable for applying the third signal to the second signal received by the receive chain to produce a compensated second signal.

2. The device of claim 1, wherein the digital form of the third signal is then converted to analog form, wherein the analog form of the third signal is applied to the analog form of the second signal received by the receive chain.

3. The device of claim 1, wherein an analog form of the second signal received by the receive chain and the analog form of the first signal transmitted by the transmit chain are input to the cancellation block via a feedback chain that is parallel to the transmit chain and the receive chain, the feedback chain comprising analog-to-digital converters.

4. The device of claim 3, wherein the feedback chain further comprises a digital predistorter observation path.

5. The device of claim 1, further comprising a switch coupled to the transmit chain and the receive chain, wherein the switch is configured to select an input to the cancellation block from among the transmit chain and the receive chain.

6. The device of claim 1, further comprising memory that stores a benchmark signal, wherein the transmit chain is operable for transmitting the benchmark signal to determine an initial value for the third signal.

7. The device of claim 6, further comprising:
a module operable for producing the first digital form of the first signal; and
a switch coupled to the memory and the module, wherein the switch is configured to select a source for the transmit chain, the source selected from among the memory and the module.

8. The device of claim 1, further comprising an antenna configuration selected from the group consisting of: a single transmit and receive antenna; a single transmit antenna and a single receive antenna; a single transmit antenna and multiple receive antennas; multiple transmit antennas and a single receive antenna; and multiple transmit antennas and multiple receive antennas.

9. A method for wireless communication, the method comprising:
transmitting an analog form of a first signal from a wireless device, the analog form converted from a first digital form of the first signal;
generating a cancellation signal that accounts for channel characteristics on the transmitted first signal, the cancellation signal generated in digital form using inputs comprising: the first digital form of the first signal, a second digital form of the first signal produced by converting the analog form of the first signal back to digital form, and a digital form of a second signal received at the wireless device, wherein the first signal is transmitted and the second signal is received concurrently within overlapping frequency bands;
converting the cancellation signal from digital form to analog form; and
applying the analog form of the cancellation signal to an analog form of the second signal received at the wireless device, to compensate for interference between the first signal transmitted by the wireless device and the second signal received by the wireless device.

10. The method of claim 9, wherein the step of applying comprises subtracting the analog form of the cancellation signal from the analog form of the second signal received at the wireless device to produce a compensated second signal, wherein the method further comprises:
converting the compensated second signal from analog form to digital form;
processing the digital form of the compensated second signal to produce a third signal that has a signal-to-noise ratio within a specified range; and
inputting the third signal to a receive baseband processor.

11. The method of claim 9, wherein the wireless device comprises a feedback path, wherein the method further comprises selecting an input to the feedback path by switching between the analog form of the second signal received at the wireless device and the analog form of the first signal.

12. The method of claim 11, wherein the feedback path further comprises a digital predistorter observation path.

13. The method of claim 9, further comprising:
accessing a benchmark signal from memory; and
transmitting the benchmark signal to determine an initial measure of the channel characteristics, wherein the initial measure is useful for determining an initial value of the cancellation signal.

14. A device comprising:
a plurality of transmit chains comprising a first transmit chain coupled to a first antenna and configured to convert a first digital form of a first signal into an analog form of the first signal, the plurality of transmit chains further comprising a second transmit chain coupled to a second antenna and configured to convert a first digital form of a second signal into an analog form of the second signal;
a receive chain coupled to a third antenna; and
a cancellation block coupled to the receive chain and the transmit chains, wherein the first transmit chain is operable for transmitting the analog form of the first signal while the second transmit chain is transmitting the analog form of the second signal and while a third signal is being received by the receive chain, the first and second transmit chains configured to transmit in overlapping frequency bands that also overlap a frequency band of the third signal; the cancellation block configured to generate a fourth signal that accounts for channel effects between the first and third antennas on the first signal transmitted by the first transmit chain and for channel effects between the second and third antennas on the second signal transmitted by the second transmit chain, the fourth signal generated using: the first digital form of the first signal, the first digital form of the second signal, a second digital form of the first signal that was converted from the analog form of the first signal, a second digital form of the second signal that was converted from the analog form of the second signal, and a digital form of the third signal; the fourth signal then subtracted from the third signal received by the receive chain to produce a compensated third signal.

15. The device of claim 14, wherein the device comprises a feedback path that is shared by the first transmit chain, the second transmit chain, and the receive chain, wherein an input to the feedback path is selected by switching between the first transmit chain, the second transmit chain, and the receive chain.

16. The device of claim 15, wherein the feedback path further comprises a digital predistorter observation path.

17. The device of claim 14, further comprising a plurality of receive chains comprising a second receive chain configured to receive a fifth signal via a fourth antenna, wherein the analog form of the first signal and the analog form of the second signal are transmitted and the fifth signal is received concurrently with one another and within overlapping frequency bands, wherein the cancellation block is configured to generate a sixth signal that accounts for channel effects between the first and fourth antennas on the first signal transmitted by the first transmit chain and that also accounts for channel effects between the second and fourth antennas on the second signal transmitted by the second transmit chain, the sixth signal then subtracted from the fifth signal received by the second receive chain to produce a compensated fifth signal.

18. The device of claim 14, further comprising a memory that stores a benchmark signal useful for determining an initial value for the fourth signal, and a module that processes baseband signals to produce the first digital form of the first signal and the first digital form of the second signal.

\* \* \* \* \*